(12) United States Patent
Wu

(10) Patent No.: US 10,609,649 B2
(45) Date of Patent: Mar. 31, 2020

(54) METHOD AND DEVICE FOR REDUCING POWER CONSUMPTION OF TERMINAL, AND SMART CARD

(71) Applicant: ZTE CORPORATION, Guangdong (CN)

(72) Inventor: Chuanxi Wu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/303,951

(22) PCT Filed: Sep. 22, 2016

(86) PCT No.: PCT/CN2016/099754
§ 371 (c)(1),
(2) Date: Dec. 17, 2018

(87) PCT Pub. No.: WO2017/201931
PCT Pub. Date: Nov. 30, 2017

(65) Prior Publication Data
US 2019/0261270 A1    Aug. 22, 2019

(30) Foreign Application Priority Data
May 23, 2016 (CN) .......................... 2016 1 0343406

(51) Int. Cl.
*H04W 52/02* (2009.01)
*H04B 1/3816* (2015.01)
*G06K 19/07* (2006.01)

(52) U.S. Cl.
CPC ...... *H04W 52/028* (2013.01); *G06K 19/0701* (2013.01); *H04B 1/3816* (2013.01); *H04W 52/02* (2013.01); *H04W 52/0212* (2013.01); *Y02D 70/122* (2018.01); *Y02D 70/124* (2018.01); *Y02D 70/126* (2018.01)

(58) Field of Classification Search
CPC ... H04W 12/06; H04W 52/028; H04W 88/02; H04W 76/19; H04W 76/30; H04W 76/38
See application file for complete search history.

(56) References Cited

U.S. PATENT DOCUMENTS

| | | | |
|---|---|---|---|
| 8,190,198 B1* | 5/2012 | Venkataramu | H04L 63/0853 370/320 |
| 2011/0319133 A1* | 12/2011 | Dong | H04W 8/205 455/558 |
| 2012/0083315 A1 | 4/2012 | Kawakishi et al. | |
| 2013/0039287 A1* | 2/2013 | Rayavarapu | H04W 68/005 370/329 |
| 2015/0288792 A1 | 10/2015 | Nayak et al. | |
| 2017/0019780 A1* | 1/2017 | Hsu | H04W 8/183 |
| 2017/0070981 A1* | 3/2017 | Anderson | H04W 76/38 |

FOREIGN PATENT DOCUMENTS

| | | |
|---|---|---|
| CN | 1494808 A | 5/2004 |
| CN | 105376420 A | 3/2016 |

* cited by examiner

*Primary Examiner* — Jean A Gelin
(74) *Attorney, Agent, or Firm* — Cantor Colburn LLP

(57) ABSTRACT

Disclosed in embodiments of the present invention is a method for reducing power consumption of a terminal, comprising: receiving a suspend command of a terminal; and storing status information of a universal integrated circuit card (UICC). Also disclosed in the embodiments of the present invention are a device for reducing power consumption of a terminal, and a smart card.

16 Claims, 9 Drawing Sheets

METHOD AND DEVICE FOR REDUCING POWER CONSUMPTION OF TERMINAL, AND SMART CARD

CROSS-REFERENCE TO RELATED APPLICATIONS

This application claims the benefit of PCT/CN2016/099754 filed Sep. 22, 2016, which claims priority to Chinese Provisional Application No. 201610343406.9 filed May 23, 2016, both of which are incorporated herein by reference in their entirety.

TECHNICAL FIELD

The present disclosure relates to a technology of managing power consumption of a terminal, and more particularly, to a method and an apparatus for reducing power consumption of a terminal, and a smart card.

BACKGROUND

A mobile communication system has gradually evolved from Second Generation (2G) to Third Generation (3G) and a Long Term Evolution (LTE) Communication System today. The coverage of network has become wider and wider, and mobile services are also gradually developed from the services mainly based on voice communication to converged communications mainly based on data services. To promote the development of the converged communications industry based on the mobile internet, it is necessary to face the power consumption challenges of terminals applied to the converged communications.

In the related art, the method for reducing power consumption of a terminal mainly reduces the power consumption of the terminal itself by changing a network side communication protocol or changing a hardware structure of the terminal. The method of changing the network side communication protocol cannot be fully adapted to various usage scenarios because the application scenarios of the terminal are varied, and the communication protocols used by the terminal are also different. the method of changing the hardware structure of the terminal is also cost-effective; and limited by the development of terminal chips, its ability to reduce power consumption is limited.

Therefore, the existing method for reducing power consumption of a terminal has limited application scenarios and limited ability to reduce power consumption.

SUMMARY

In order to solve the above technical problems, the embodiments of the present disclosure are expected to provide a method and an apparatus for reducing power consumption of a terminal, and a smart card, which are used to expand the application scenarios of the method for reducing power consumption of a terminal, and improve the ability to reduce the power consumption.

The technical solutions of the embodiments of the present disclosure are realized as follows.

A method for reducing power consumption of a terminal includes:
receiving a suspend command of a terminal; and
storing status information of a Universal Integrated Circuit Card (UICC).
In the foregoing solution, the method further includes:
sending a suspend response command to the terminal, the suspend response command including a suspend time duration and a keyword of recovering the status information of the UICC.

In the foregoing solution, before the receiving the suspend command of the terminal, the method further includes:
modifying a UICC service table to add instruction information of instructing the suspend command and a recovery command into the UICC service table; and
sending the modified UICC service table to the terminal.
In the foregoing solution, the modifying the UICC service table is: to add first instruction information and second instruction information after the UICC service table; wherein, the first instruction information instructs a UICC suspend command, and the second instruction information instructs a UICC recovery command.

In the foregoing solution, the status information of the UICC includes:
a status of a Network Access Application NAA selected by each logical channel of the UICC, a security condition of each network access application of the UICC, a basic file selected by each logical channel of the UICC, and at least one of a corresponding record and a status of an application toolbox of the UICC.

A method for reducing power consumption of a terminal includes:
receiving a recovery command of a terminal, the recovery command including:
a keyword of recovering status information of a UICC;
switching on and initializing the UICC;
when the UICC confirms to a recovery condition and the status information of the UICC exists, matching the keyword of recovering the status information of the UICC in the recovery command with the status information of the UICC;
when the matching is successful, recovering according to the status information of the UICC corresponding to the keyword, and sending response information of successful recovery to the terminal; and
deleting the status information of the UICC corresponding to the keyword.

In the foregoing solution, the confirming to the recovery condition includes:
the UICC not performing an initialization process, the UICC not receiving a terminal configuration command, and the UICC not performing a command to select a base file name.

In the foregoing solution, the status information of the UICC includes:
a status of a Network Access Application NAA selected by each logical channel of the UICC, a security condition of each network access application of the UICC, a basic file selected by each logical channel of the UICC, and at least one of a corresponding record and a status of an application toolbox of the UICC.

A method for reducing power consumption of a terminal includes:
when a UICC confirms to a suspend condition, sending a suspend command to the UICC;
receiving a suspend response command sent by the UICC; and
switching off the UICC according to the suspend response command.

In the foregoing solution, the suspend response command includes a suspend time duration and a keyword of recovering status information of the UICC.

In the foregoing solution, before the sending the suspend command to the UICC, the method further includes:

acquiring a modified UICC service table sent by the UICC;

determining whether the UICC supports the suspend command and the recovery command according to the modified UICC service table; and when both the UICC and the terminal support the suspend command and the recovery command, performing a subsequent suspend operation and a subsequent recovery operation.

In the foregoing solution, the status information of the UICC includes:

a status of a Network Access Application NAA selected by each logical channel of the UICC, a security condition of each network access application of the UICC, a basic file selected by each logical channel of the UICC, and at least one of a corresponding record and a status of an application toolbox of the UICC.

A method for reducing power consumption of a terminal includes:

when a UICC confirms to a recovery condition, sending a recovery command to the UICC;

switching on a power source of the UICC; and receiving response information sent by the UICC.

In the foregoing solution, the recovery command includes: a keyword of recovering status information of the UICC.

In the foregoing solution, the status information of the UICC includes:

a status of a Network Access Application NAA selected by each logical channel of the UICC, a security condition of each network access application of the UICC, a basic file selected by each logical channel of the UICC, and at least one of a corresponding record and a status of an application toolbox of the UICC.

An apparatus for reducing power consumption of a terminal includes:

a receiving module configured to receive a suspend command of a terminal; and a processing module configured to store status information of a Universal Integrated Circuit Card UICC.

In the foregoing solution, the apparatus further includes:

a sending module configured to send a suspend response command to the terminal, the suspend response command including a suspend time duration and a keyword of recovering the status information of the UICC.

In the foregoing solution, the apparatus further includes:

a modifying module configured to modify a UICC service table to add instruction information of instructing the suspend command and a recovery command into the UICC service table, wherein:

the sending module is further configured to send the modified UICC service table to the terminal.

In the foregoing solution, the modifying module is specifically configured to:

add first instruction information and second instruction information after the UICC service table; wherein, the first instruction information instructs a UICC suspend command, and the second instruction information instructs a UICC recovery command.

In the foregoing solution, the status information of the UICC includes:

a status of a Network Access Application NAA selected by each logical channel of the UICC, a security condition of each network access application of the UICC, a basic file selected by each logical channel of the UICC, and at least one of a corresponding record and a status of an application toolbox of the UICC.

An apparatus for reducing power consumption of a terminal includes:

a receiving module configured to receive a recovery command of a terminal, the recovery command including: a keyword of recovering status information of a UICC;

an initializing module configured to switch on and initialize the UICC;

a matching module configured to, when the UICC confirms to a recovery condition and the status information of the UICC exists, match the keyword of recovering the status information of the UICC in the recovery command with the status information of the UICC;

a recovery module configured to, when the matching the keyword of recovering the status information of the UICC in the recovery command with the status information of the UICC is successful, recover according to the status information of the UICC corresponding to the keyword, and send response information of successful recovery to the terminal; and a deleting module configured to delete the status information of the UICC corresponding to the keyword.

In the foregoing solution, the confirming to the recovery condition includes:

the UICC not performing an initialization process, the UICC not receiving a terminal configuration command, and the UICC not performing a command to select a base file name.

In the foregoing solution, the status information of the UICC includes:

a status of a Network Access Application NAA selected by each logical channel of the UICC, a security condition of each network access application of the UICC, a basic file selected by each logical channel of the UICC, and at least one of a corresponding record and a status of an application toolbox of the UICC.

An apparatus for reducing power consumption of a terminal includes:

a sending module configured to, when a UICC confirms to a suspend condition, send a suspend command to the UICC;

a receiving module configured to receive a suspend response command sent by the UICC; and a switching-off module configured to switch off the UICC according to the suspend response command.

In the foregoing solution, the suspend response command includes a suspend time duration and a keyword of recovering status information of the UICC.

In the foregoing solution, the apparatus further includes:

an acquisition module configured to acquire a modified UICC service table sent by the UICC;

a determining module configured to determine whether the UICC supports the suspend command and the recovery command according to the modified UICC service table; and a processing module configured to, when both the UICC and the terminal support the suspend command and the recovery command, perform a subsequent suspend operation and a subsequent recovery operation.

In the foregoing solution, the status information of the UICC includes:

a status of a Network Access Application NAA selected by each logical channel of the UICC, a security condition of each network access application of the UICC, a basic file selected by each logical channel of the UICC, and at least one of a corresponding record and a status of an application toolbox of the UICC.

An apparatus for reducing power consumption of a terminal includes:

a sending module configured to, when a UICC confirms to a recovery condition, send a recovery command to the UICC;

a switching-on module configured to switch on the UICC; and a receiving module configured to receive response information sent by the UICC.

In the foregoing solution, the recovery command includes: a keyword of recovering status information of the UICC.

In the foregoing solution, the status information of the UICC includes:

a status of a Network Access Application NAA selected by each logical channel of the UICC, a security condition of each network access application of the UICC, a basic file selected by each logical channel of the UICC, and at least one of a corresponding record and a status of an application toolbox of the UICC.

A smart card includes a UICC implementing the above-mentioned methods.

The embodiments of the present disclosure provide the method and apparatus for reducing power consumption of a terminal, and the smart card. According to the method, when detecting that the Universal Integrated Circuit Card (UICC) is in an idle status, the terminal sends the suspend command to the UICC, and after receiving the suspend command of the terminal, the UICC stores the status information of the UICC, so that the terminal controls to switch off the UICC, and the UICC enters the suspended status, thereby reducing the power consumption of the UICC, and then greatly reducing the power consumption of the terminal; and the UICC can be recovered based on related contents of the stored status information of the UICC when recovering. The method does not need to change the network side communication protocols or change the hardware structure of the terminal, thereby expanding the application scenarios of the method for reducing power consumption of a terminal, and improving the ability to reduce the power consumption.

DETAILED DESCRIPTION

Figure 1:
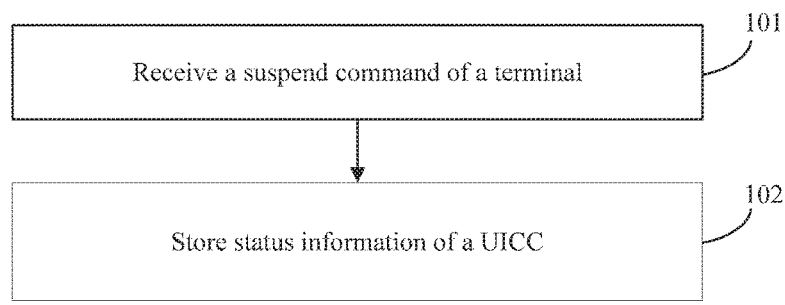
FIG. 1 is a schematic flowchart of a first embodiment of a method for reducing power consumption of a terminal provided by the embodiments of the present disclosure.

The technical solutions in the embodiments of the invention will be clearly and completely described below with reference to the accompanying drawings in the embodiments of the invention.

The embodiments of the present disclosure are applicable to various networks, and are particularly suitable for the rapidly developing Internet of Things (IoT). As an important part of the emerging high-tech industry, the IoT has been regarded as one of the key technologies for coping with the economic crisis and revitalizing the economy. The IoT service can be widely used in many industries, including vehicles, electricity, finance, environmental protection, petroleum, personal and corporate security, hydrology, military, fire, weather, coal, agriculture and forestry, elevators, etc. It is anticipated by experts that the IoT service will quickly enter many industries, and its number of users will also grow rapidly in next few years. In 2013, the global IoT market size was about 301.2 billion US dollars, and in 2014 it was increased to 346.8 billion US dollars. IoT applications will also become one of the core applications of the Fifth Generation (5G) in a few years and have broad development prospects. The carrying of IoT information is mainly based on carriers such as wired transmission (such as wired broadband), short-range wireless transmission (such as Wi-Fi, ZigBee, RFID, etc.) and mobile internet (such as 2G, 3G and LTE networks). The IoT based on the mobile internet carrying is occupying an increasingly important position, which is applied to scenarios not suitable for wiring or having higher wiring costs and some special scenarios, such as remote logistics transportation and monitoring, and remote control of energy "three-meters", monitoring and control of field equipment, tracking of children and old age people, police management, tracking of criminals, and other occasions. Batteries are usually used in IoT terminals in these industries for power supply, and the batteries of the terminals are required not to be replaced for a long time (such as half a year or longer, the longer the better). Therefore, it is necessary to face the power consumption challenges of IoT terminals to promote the development of the IoT industry based on the mobile internet. Taking an ordinary mobile phone terminal as an example, in a power cycle, a UICC card activated by the terminal for use mainly includes the following situations. For example, the terminal reads and stores configuration parameters set by an operator in the UICC, the terminal performs an authentication process, the terminal writes data to the UICC card, and the terminal reads short messages and phone book of a user stored on the UICC, and the use of a card toolbox command, etc. In the remaining time, the UICC is not activated by the terminal. In addition, as estimated by the industry, when comparing the power consumption generated by the UICC when the UICC is switched off with the power consumption generated by the UICC when the UICC is not switched off, the energy consumption of the latter is about 40 times more than the former within one week. At the same time, in the IoT terminal, according to the characteristics of mobile IoT applications and service models, mobile IoT scenarios can be divided into the following categories. (1) Fixed or low mobility IoT terminal application scenarios use fixed or low mobility IoT devices (such as three-meters, transformer monitoring terminals, etc.), and these devices are generally in application scenarios with fixed positions or low mobility. (2) Communication time limit and constraint scenario: this scenario refers to sending and receiving data and communicating according to a preset specific time interval, and the terminal is in an off status at other time. An IoT platform can permit or deny service access of the terminal device without the preset specific time limit. For the prohibited time period, the platform directly refuses access. With this feature, the terminal device can access and communicate within the preset specific time limit, and is in a low power consumption status at other times. (3) Only intra-caller service scenarios are supported. The IoT devices only support the intra-caller service scenarios. The scenarios require the IoT terminal devices to periodically or non-periodically report information to the platform without receiving instructions or information sent from the platform. (4) Infrequent called service scenarios: for infrequent called service scenarios, the probability of the terminals accepting and responding to the paging is very low. It can be seen from above that most IoT terminals are inactive during most of the time. Based on this, the embodiments of the present disclosure provide a method for reducing power consumption of a terminal so as to meet the needs of the increasingly growing IoT applications; when the UICC is in inactive status, the power consumption of the UICC is reduced by removing the power supply of the UICC, thereby reducing the power consumption of the terminal. Therefore, the service time of the mobile IoT terminal batteries is improved.

The implementation method is to reduce the power consumption of the UICC by modifying and optimizing the communication protocol between the terminal and the UICC without changing the network side and terminal hardware, thereby reducing the average power consumption of the terminal, so as to achieve the purpose of improving the service time of the mobile IoT terminal batteries.

FIG. 1 is a schematic flowchart of a first embodiment of the method for reducing power consumption of a terminal provided by the embodiments of the present disclosure. As shown in FIG. 1, an executive body of the embodiment is a UICC, and the method includes the following steps.

In step 101, a suspend command of a terminal is received.

In the step, a UICC receives the suspend command sent by the terminal, wherein the suspend command includes: a recommended maximum suspend time duration given by the terminal. When detecting that the UICC confirms to a suspend condition, the terminal will send the suspend command to the UICC, the suspend command including the maximum suspend time duration given by the terminal. After receiving the suspend command, the UICC performs a subsequent suspend operation.

In step 102, status information of the UICC is stored.

Optionally, the method further including: sending a suspend response command to the terminal, the suspend response command including a suspend time duration and a keyword of recovering the status information of the UICC.

In the step, after receiving the suspend command of the terminal, the UICC stores the current status information of the UICC, and specifically stores the status information in a non-volatile memory of the UICC, wherein the status information of the UICC is the status information to be recovered later; in the meanwhile, the UICC sends a suspend response command to the terminal, wherein the suspend response command includes the suspend time duration and the keyword of recovering the status information, i.e., the suspend time duration (the suspend time duration determined by the interaction of the terminal and the UICC) The length of time) finally determined by the UICC and the keyword of recovering the information. A value of the corresponding keyword of recovering the information is transmitted to the terminal by using the suspend response command, and is stored in a memory of the terminal by the terminal for comparison while recovering the status of the UICC. Specifically, the keyword and the status information entries of the UICC stored in the non-volatile memory of the UICC are matched, and if the matching is successful, then the status information of the UICC is recovered according to the keyword to recover the UICC to the previous status. At this time, the terminal controls to switch off the UICC, and the UICC enters a suspended status.

According to the method for reducing power consumption of a terminal of the embodiment, the UICC after receiving the suspend command sent by the terminal, stores the status information of the UICC, so that the terminal further controls to switch off the UICC, and the UICC enters the suspended status; moreover, the UICC can be recovered according to the related contents of the stored status information of the UICC while recovering. According to the method, the power consumption of the UICC is reduced without changing the network side communication protocols and the hardware structure of the terminal, thereby reducing the average power consumption of the terminal, expanding the application scenarios of the method for reducing power consumption of a terminal, and improving the ability to reduce the power consumption.

Optionally, before the receiving the suspend command of the terminal, the method further includes:

modifying a UICC service table to add instruction information of instructing the suspend command and a recovery command into the UICC service table; and sending the modified UICC service table to the terminal.

To be specific, the UICC service table is modified, so that the UICC service table uses one bit to instruct the UICC suspend command and uses one bit to instruct the UICC recovery command.

Optionally, the modifying the UICC service table is: to add first instruction information and second instruction information after the UICC service table; wherein, the first instruction information instructs a UICC suspend command, and the second instruction information instructs a UICC recovery command.

To be specific, it is explained by taking one application USIM card of the UICC as an example. Modified results are as shown in Table 1. Table 1 is the modified USIM Service Table. Referring to 3GPP TS 31.102 (8.40 version), it can be seen that following fields are added at the end of Table 1:

Service n°XX UICC suspend command
Service n°YY UICC recovery command

| Identifier: '6F38' SFI: '04' File size: X bytes, (X ≥ 1) | | Structure: transparent Update activity: low | | Mandatory |
|---|---|---|---|---|
| Access Conditions: | | | | |
| READ | | PIN | | |
| UPDATE | | ADM | | |
| DEACTIVATE | | ADM | | |
| ACTIVATE | | ADM | | |
| Bytes | Description | | M/O | Length |
| 1 | Services n° 1 to n° 8 | | M | 1 byte |
| 2 | Services n° 9 to n° 16 | | O | 1 byte |
| 3 | Services n° 17 to n° 24 | | O | 1 byte |
| 4 | Services n° 25 to n° 32 | | O | 1 byte |
| etc. | | | | |
| X | Services n° (8X-7) to n° (8X) | | O | 1 byte |

Services Contents:
Service n°1: Local Phone Book
Service n°2: Fixed Dialling Numbers (FDN)
Service n°3: Extension 2
Service n°4: Service Dialling Numbers (SDN)
Service n°5: Extension3
Service n°6: Barred Dialling Numbers (BDN)
Service n°7: Extension4
Service n°8: Outgoing Call Information (OCI and OCT)
Service n°9: Incoming Call Information (ICI and ICT)
Service n°10: Short Message Storage (SMS)
Service n°11: Short Message Status Reports (SMSR)
Service n°12: Short Message Service Parameters (SMSP)
Service n°13: Advice of Charge (AoC)
Service n°14: Capability Configuration Parameters 2 (CCP2)
Service n°15: Cell Broadcast Message Identifier
Service n°16: Cell Broadcast Message Identifier Ranges
Service n°17: Group Identifier Level 1
Service n°18: Group Identifier Level 2
Service n°19: Service Provider Name
Service n°20: User controlled PLMN selector with Access Technology
Service n°21: MSISDN
Service n°22: Image (IMG)
Service n°23: Support of Localised Service Areas (SoLSA)
Service n°24: Enhanced Multi-Level Precedence and Pre-emption Service
Service n°25: Automatic Answer for eMLPP
Service n°26: RFU
Service n°27: GSM Access
Service n°28: Data download via SMS-PP
Service n°29: Data download via SMS-CB
Service n°30: Call Control by USIM
Service n°31: MO-SMS Control by USIM
Service n°32: RUN AT COMMAND command
Service n°33: shall be set to '1'
Service n°34: Enabled Services Table
Service n°35: APN Control List (ACL)
Service n°36: Depersonalisation Control Keys
Service n°37: Co-operative Network List
Service n°38: GSM security context
Service n°39: CPBCCH Information
Service n°40: Investigation Scan
Service n°41: MExE
Service n°42: Operator controlled PLMN selector with Access Technology
Service n°43: HPLMN selector with Access Technology
Service n°44: Extension 5
Service n°45: PLMN Network Name
Service n°46: Operator PLMN List
Service n°47: Mailbox Dialling Numbers
Service n°48: Message Waiting Indication Status
Service n°49: Call Forwarding Indication Status
Service n°50: Reserved and shall be ignored
Service n°51: Service Provider Display Information
Service n°52 Multimedia Messaging Service (MMS)
Service n°53 Extension 8
Service n°54 Call control on GPRS by USIM
Service n°55 MMS User Connectivity Parameters
Service n°56 Network's indication of alerting in the MS (NIA)
Service n°57 VGCS Group Identifier List (EFVGCs and EFVGCSS)
Service n°58 VBS Group Identifier List (EFVBs and EFVBSS)
Service n°59 Pseudonym
Service n°60 User Controlled PLMN selector for I-WLAN access
Service n°61 Operator Controlled PLMN selector for I-WLAN access
Service n°62 User controlled WSID list
Service n°63 Operator controlled WSID list
Service n°64 VGCS security
Service n°65 VBS security
Service n°66 WLAN Reauthentication Identity
Service n°67 Multimedia Messages Storage
Service n°68 Generic Bootstrapping Architecture (GBA)
Service n°69 MBMS security
Service n°70 Data download via USSD and USSD application mode
Service n°71 Equivalent HPLMN
Service n°72 Additional TERMINAL PROFILE after UICC activation
Service n°73 Equivalent HPLMN Presentation Indication
Service n°74 Last RPLMN Selection Indication
Service n°75 OMA BCAST Smart Card Profile
Service n°76 GBA-based Local Key Establishment Mechanism
Service n°77 Terminal Applications
Service n°78 Service Provider Name Icon
Service n°79 PLMN Network Name Icon
Service n°80 Connectivity Parameters for USIM IP connections
Service n°81 Home I-WLAN Specific Identifier List
Service n°82 I-WLAN Equivalent HPLMN Presentation Indication
Service n°83 I-WLAN HPLMN Priority Indication
Service n°84 I-WLAN Last Registered PLMN
Service n°85 EPS Mobility Management Information
Service n°86 Allowed CSG Lists and corresponding indications
Service n°XX Allow to execute UICC suspend command
Service n°YY Allow to execute UICC recovery command
Table 1

Figure 2:
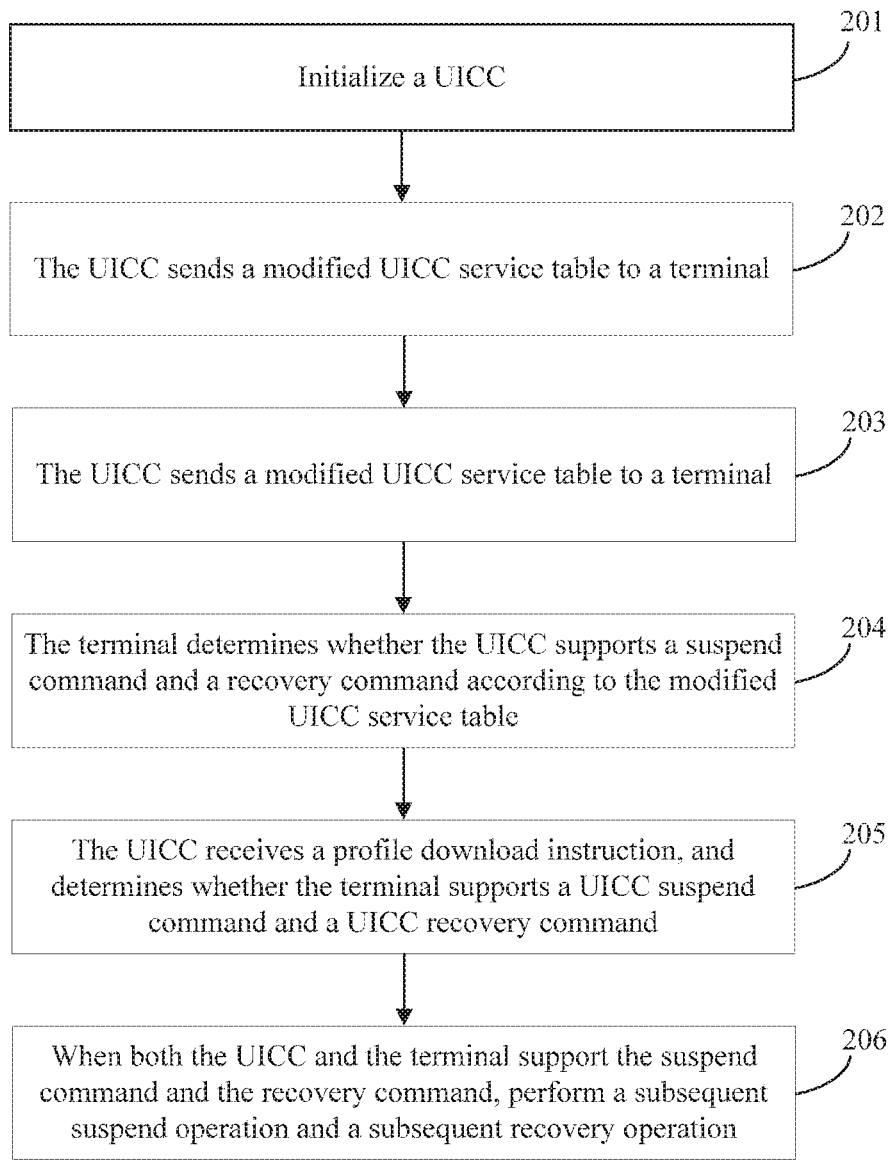
FIG. 2 is schematic flowchart illustrating interaction between a terminal and a UICC after modifying a UICC service table.

FIG. 2 is schematic flowchart illustrating interaction between a terminal and a UICC after modifying a UICC service table. As shown in FIG. 2, the process includes the following steps:

In step 201, a UICC is initialized.

In step 202, the UICC sends a modified UICC service table to a terminal.

The UICC (USIM application) instructs to the terminal that the SIM Service Table thereof supports "Additional TERMINAL PROFILE".

In step 203, the terminal acquires the modified UICC service table sent by the UICC.

In step 204, the terminal determines whether the UICC supports a suspend command and a recovery command according to the modified UICC service table.

In step 205, the UICC, after receiving a profile download instruction, determines whether the terminal supports a UICC suspend command and a UICC recovery command.

To be specific, the terminal checks whether the UICC supports the UICC suspend command and the UICC recovery command according to the modified USIM service table; if the terminal finds that both the UICC and the terminal itself support the UICC suspend command and the UICC recovery command, then the terminal executes a Profile download process (the terminal sends a profile download instruction to the UICC) to show that the terminal itself also supports the UICC suspend command and the UICC recovery command; if the terminal itself does not support the UICC suspend command and the UICC recovery command, then the terminal executes a Profile download process (the terminal sends a profile download instruction to the UICC) to show that the terminal itself does not support the UICC suspend command and the UICC recovery command.

Otherwise, if the terminal finds that the UICC does not support the UICC suspend command and the UICC recovery command, then the terminal executes a Profile download process (the terminal sends a profile download instruction to the UICC), and will not initiate the UICC suspend command and the UICC recovery command to the UICC.

In step 206, when both the UICC and the terminal support the suspend command and the recovery command, a subsequent suspend operation and a subsequent recovery operation are performed.

If the terminal supports the UICC suspend command and the UICC recovery command, and the UICC itself also supports the UICC suspend command and the UICC recovery command, the operations of the UICC suspend command and the UICC recovery command can be performed subsequently; otherwise, the operations of the UICC suspend command and the UICC recovery command cannot be performed.

Optionally, the status information of the UICC includes: a status of a Network Access Application (NAA) selected by each logical channel of the UICC, a security condition of each network access application of the UICC, a basic file selected by each logical channel of the UICC, and at least one of a corresponding record and a status of an application toolbox of the UICC.

Figure 3:
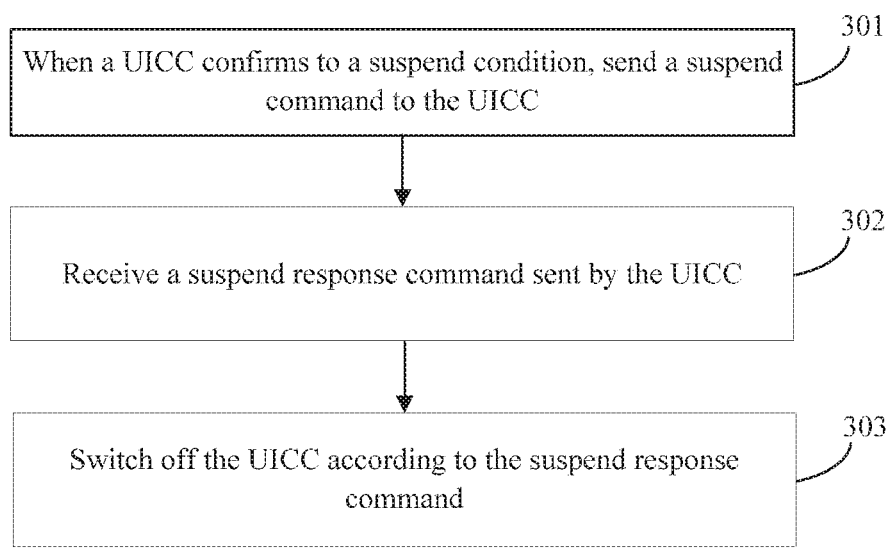
FIG. 3 is a schematic flowchart of a second embodiment of the method for reducing power consumption of a terminal provided by the embodiments of the present disclosure.

FIG. 3 is a schematic flowchart of a second embodiment of the method for reducing power consumption of a terminal provided by the embodiments of the present disclosure. As shown in FIG. 3, an executive body of the embodiment is a terminal, and the method includes the following steps.

In step 301, when a UICC confirms to a suspend condition, a suspend command is sent to the UICC;

In the step, the terminal detects whether the UICC confirms to a suspend condition, wherein the terminal detecting whether the UICC confirms to the suspend condition includes: the terminal not performing a process of reading and storing configuration parameter set by an operator in the UICC, the terminal not performing a process of authentication, the terminal not writing data into the UICC, and the terminal not reading short messages and telephone book of a user stored on the UICC and/or not using a card toolbox command. When the terminal detects that the UICC satisfies the above-mentioned suspend condition, the suspend command is sent to the UICC.

In step 302, a suspend response command sent by the UICC is received.

The suspend response command includes a suspend time duration and a keyword of recovering status information of the UICC.

The status information of the UICC includes: a status of a Network Access Application NAA selected by each logical channel of the UICC, a security condition of each network access application of the UICC, a basic file selected by each logical channel of the UICC, and at least one of a corresponding record and a status of an application toolbox of the UICC.

In the step, the terminal receives the suspend response command sent by the UICC, the command including the suspend time duration determined by the UICC and the keyword of recovering the status information of the UICC. The terminal receives the keyword, and stores the keyword of recovering the status information of the UICC in the suspend response command, so as to use the keyword for comparison while recovering.

In step 303, the UICC is switched off according to the suspend response command.

Optionally, a time duration for switching off the UICC can be determined according to the suspend time duration in the suspend response command.

According to the method for reducing power consumption of a terminal of the embodiment, the terminal, when detecting that the UICC confirms to the suspend condition, sends the suspend command to the UICC, receives the suspend response command sent by the UICC, and stores the keyword of recovering the status information of the UICC in the suspend response command, so that the keyword can be used for comparison while recovering the status of the UICC subsequently. The UICC is switched off, and the time duration for switching off the UICC is determined according to the suspend time duration in the suspend response command.

Optionally, before the sending the suspend command to the UICC, the method further includes:

acquiring a modified UICC service table sent by the UICC;

determining whether the UICC supports the suspend command and the recovery command according to the modified USIM service table; and when both the UICC and the terminal support the suspend command and the recovery command, performing a subsequent suspend operation and a subsequent recovery operation.

The process has already been illustrated in detail in the interaction process between the terminal and the UICC after the UICC service table is modified, and will not be elaborated herein.

Figure 4:
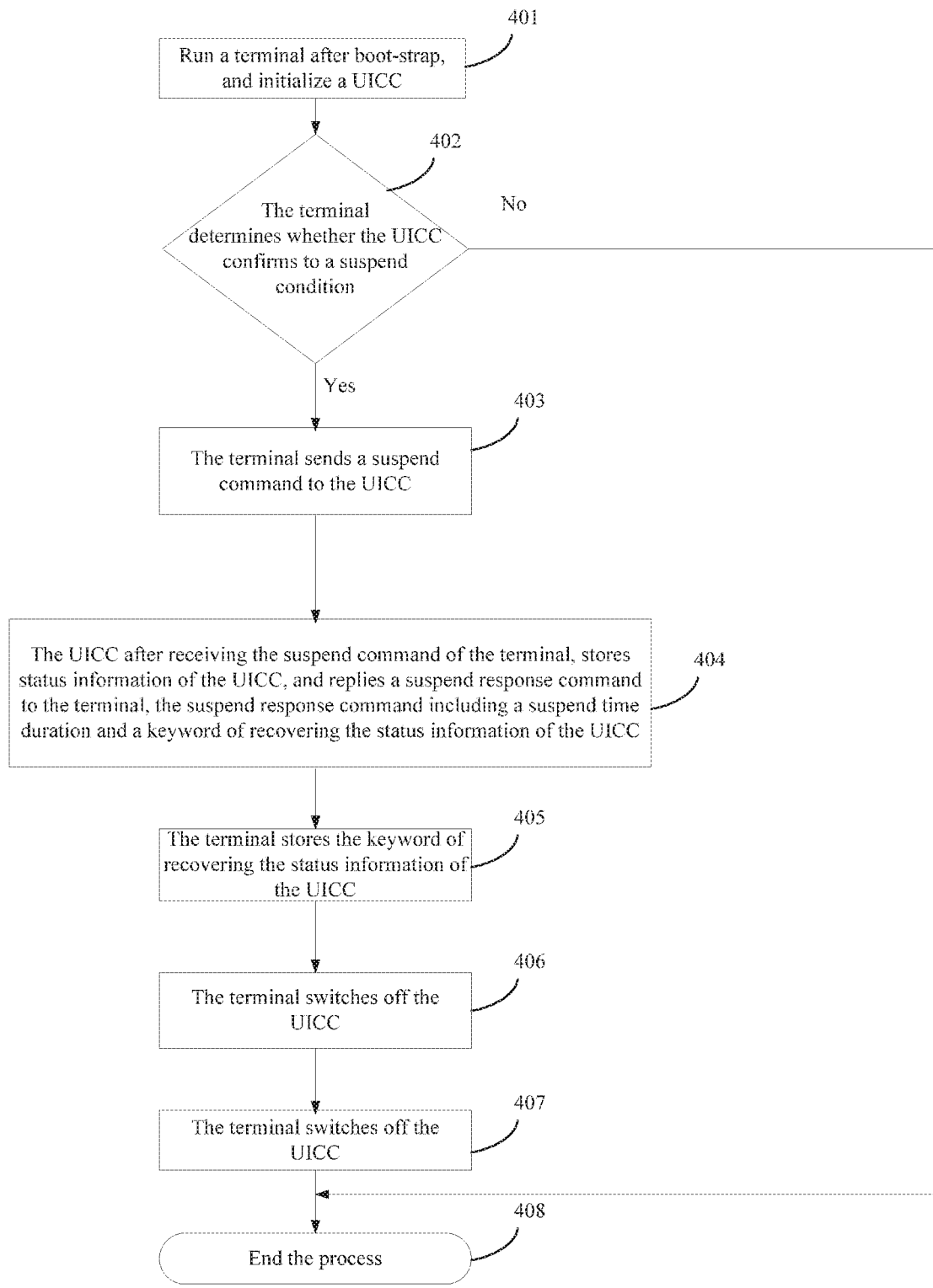
FIG. 4 is a schematic flowchart of a UICC suspend process according to the embodiments of the present disclosure.

FIG. 4 is a schematic flowchart of a UICC suspend process according to the embodiments of the present disclosure. As shown in FIG. 4, the process includes the interaction process between the terminal and the UICC, which includes the following steps.

In step 401, a terminal is run after boot-strap, and a UICC is initialized.

In step 402, the terminal determines whether the UICC confirms to a suspend condition. If yes, step 403 is performed; otherwise, step 408 is performed.

In step 403, the terminal sends a suspend command to the UICC.

In step 404, the UICC after receiving the suspend command of the terminal, stores status information of the UICC, and replies a suspend response command to the terminal, the suspend response command including a suspend time duration and a keyword of recovering the status information of the UICC.

In step 405, the terminal stores the keyword of recovering the status information of the UICC.

In step 406, the terminal switches off the UICC.

In step 407, the UICC enters a suspended status.

In step 408, the process is ended.

The above is the specific steps of hanging the UICC. The following is a detailed description of the specific steps to recover the previous status of the UICC after being suspended.

Figure 5:
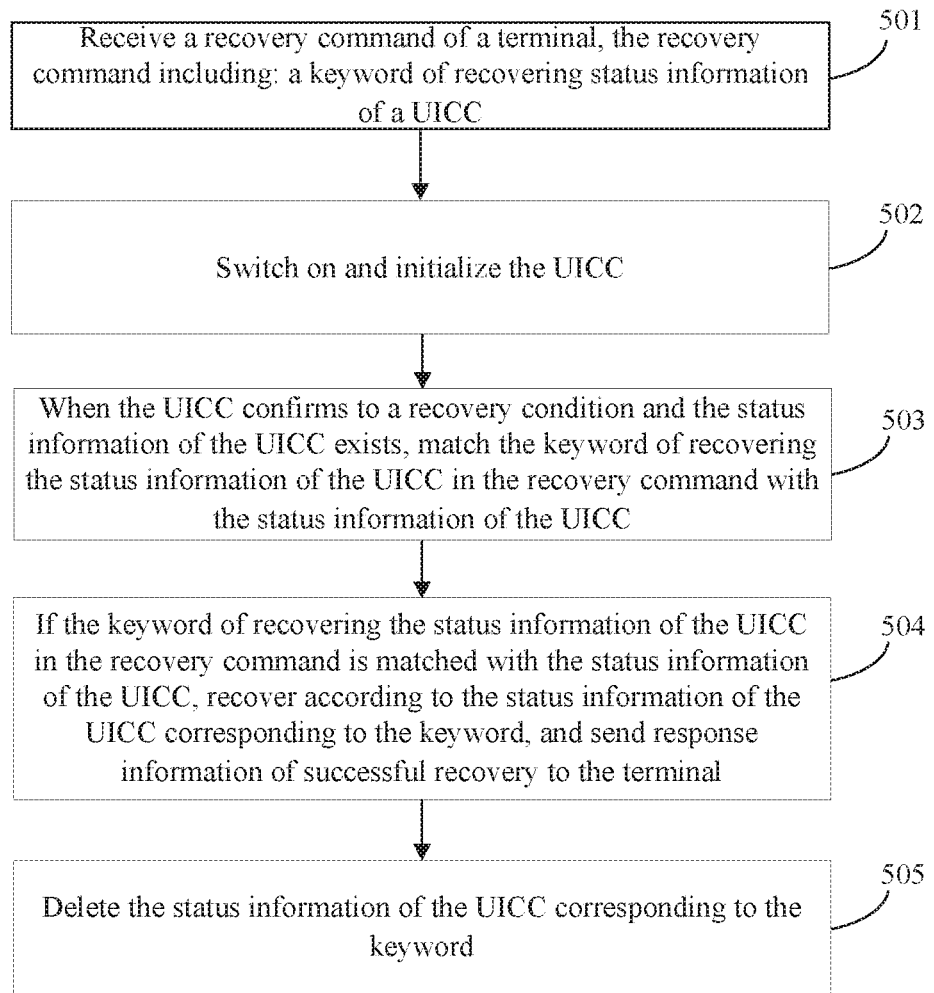
FIG. 5 is a schematic flowchart of a third embodiment of the method for reducing power consumption of a terminal provided by the embodiments of the present disclosure.

FIG. 5 is a schematic flowchart of a third embodiment of the method for reducing power consumption of a terminal provided by the embodiments of the present disclosure. As shown in FIG. 5, an executive body of the embodiment is a UICC, and the method includes the following steps.

In step 501, a recovery command of a terminal is received, the recovery command including: a keyword of recovering status information of the UICC.

In the step, the UICC receives the recovery command of the terminal, the recovery command including the keyword of recovering the status information of the UICC stored in the terminal.

In step 502, the UICC is switched on and initialized.

In the step, after the UICC is re-switched on, an initialization process needs to be executed again, so as to ensure that status contents of the UICC can be normally recovered to the previous status subsequently.

In step 503, when the UICC confirms to a recovery condition and the status information of the UICC exists, the keyword of recovering the status information of the UICC in the recovery command is matched with the status information of the UICC.

In the step, when the status contents of the UICC needing to be recovered exist in a non-volatile memory of the UICC, the keyword of recovering the status information of the UICC in the recovery command sent by the terminal is matched with a status content entry stored on the non-volatile memory of the UICC.

Otherwise, when no status contents of the UICC needing to be recovered exist in the non-volatile memory of the UICC, the UICC will reject to execute the UICC recovery command; the recovering of the UICC is unsuccessful, and the UICC continues entering a suspended status.

In step 504, if the keyword of recovering the status information of the UICC in the recovery command is matched with the status information of the UICC, recovering is performed according to the status information of the UICC corresponding to the keyword, and response information of successful recovery is sent to the terminal.

In the step, if the keyword of recovering the status information of the UICC is matched with the status information of the UICC, then the UICC is recovered to the previous status according to the status information of the UICC corresponding to the keyword, and the response information of successful recovery is sent to the terminal; otherwise, if the matching is unsuccessful, the recovering of the UICC is unsuccessful, the UICC continues enters the suspended status, and sends response information of unsuccessful recovery to the terminal.

In step 505, the status information of the UICC corresponding to the keyword is deleted.

In the step, after the recovering is successful, the recovered status information of the UICC is deleted, i.e., the above-mentioned status information of the UICC corresponding to the keyword.

According to the method for reducing power consumption of a terminal of the embodiment, after the UICC is suspended, if detecting that the UICC confirms to the recovery condition, the terminal sends the recovery command to the UICC and switches on the UICC, wherein the recovery command includes: the keyword of recovering the status information of the UICC; the UICC after receiving the recovery command of the terminal, matches the keyword of recovering the status information of the UICC in the recovery command with the status information of the UICC; if the matching is successful, then recovering is performed according to the status information of the UICC corresponding to the keyword, sends the response information of successful recovery to the terminal, and deletes the status information of the UICC corresponding to the keyword, so that the UICC can be recovered to the previous status after being suspended.

Optionally, the above-mentioned response information of unsuccessful recovery further includes different status words, and unsuccessful reasons can be notified to the terminal by means of returning different status words to the terminal.

Optionally, the confirming to the recovery condition includes:

the UICC not performing an initialization process, the UICC not receiving a terminal configuration command, and the UICC not performing a command to select a base file name.

Optionally, the status information of the UICC includes: a status of a Network Access Application NAA selected by each logical channel of the UICC, a security condition of each network access application of the UICC, a basic file selected by each logical channel of the UICC, and at least one of a corresponding record and a status of an application toolbox of the UICC.

Figure 6:
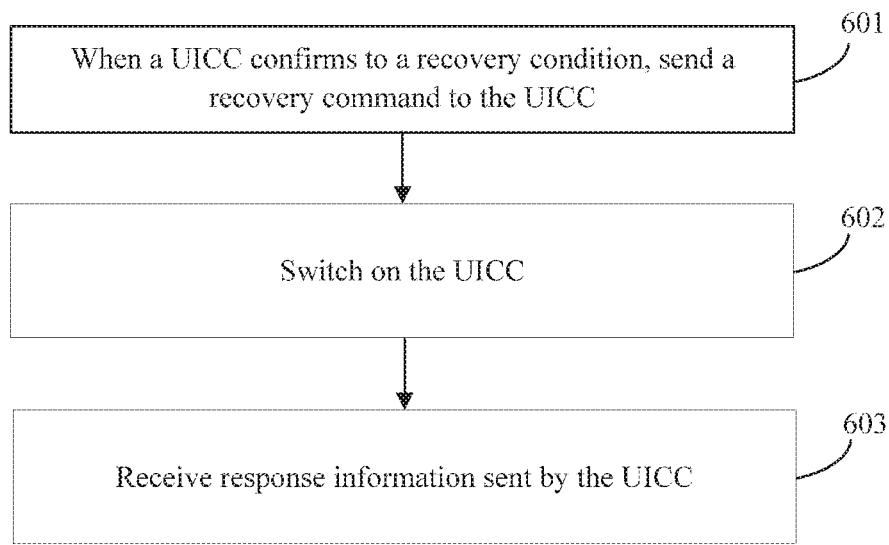
FIG. 6 is a schematic flowchart of a fourth embodiment of the method for reducing power consumption of a terminal provided by the embodiments of the present disclosure.

FIG. 6 is a schematic flowchart of a fourth embodiment of the method for reducing power consumption of a terminal provided by the embodiments of the present disclosure. As shown in FIG. 6, an executive body of the embodiment is a terminal, and the method includes the following steps.

In step 601, when a UICC confirms to a recovery condition, a recovery command is sent to the UICC.

The recovery command includes: a keyword of recovering status information of the UICC. The status information of the UICC includes: a status of a Network Access Application NAA selected by each logical channel of the UICC, a security condition of each network access application of the UICC, a basic file selected by each logical channel of the UICC, and at least one of a corresponding record and a status of an application toolbox of the UICC.

In the step, when detecting that the UICC confirms to the recovery condition, the terminal sends the recovery command to the UICC, the UICC confirms to the suspend condition includes: the UICC not performing an initialization process, the UICC not receiving a terminal configuration command, and the UICC not performing a command to select a base file name. The recovery command includes the keyword of recovering the status information of the UICC stored by the terminal.

In step 602, the UICC is switched on.

In the step, the terminal switches on the UICC.

In step 603, response information sent by the UICC is received.

In the step, the terminal receives the response information sent by the UICC, the response information including: response information of successful recovery or unsuccessful recovery, and the response information of unsuccessful recovery includes different status words. The status words instruct reasons of unsuccessful recovery, and the terminal determines the reasons of unsuccessful recovery according to the status words.

According to the method for reducing power consumption of a terminal of the embodiment, when the UICC confirms to the recovery condition, the terminal sends the recovery command to the UICC, and controls to switch on the UICC, so that the UICC performs the recovery process according to the keyword of recovering the status information of the UICC in the suspend response command, thus being recovered to the status before being suspended. Optionally, the terminal acquires a recovering result of the UICC by receiving the response information sent by the UICC, and may also acquire the reasons of unsuccessful recovery.

Figure 7:
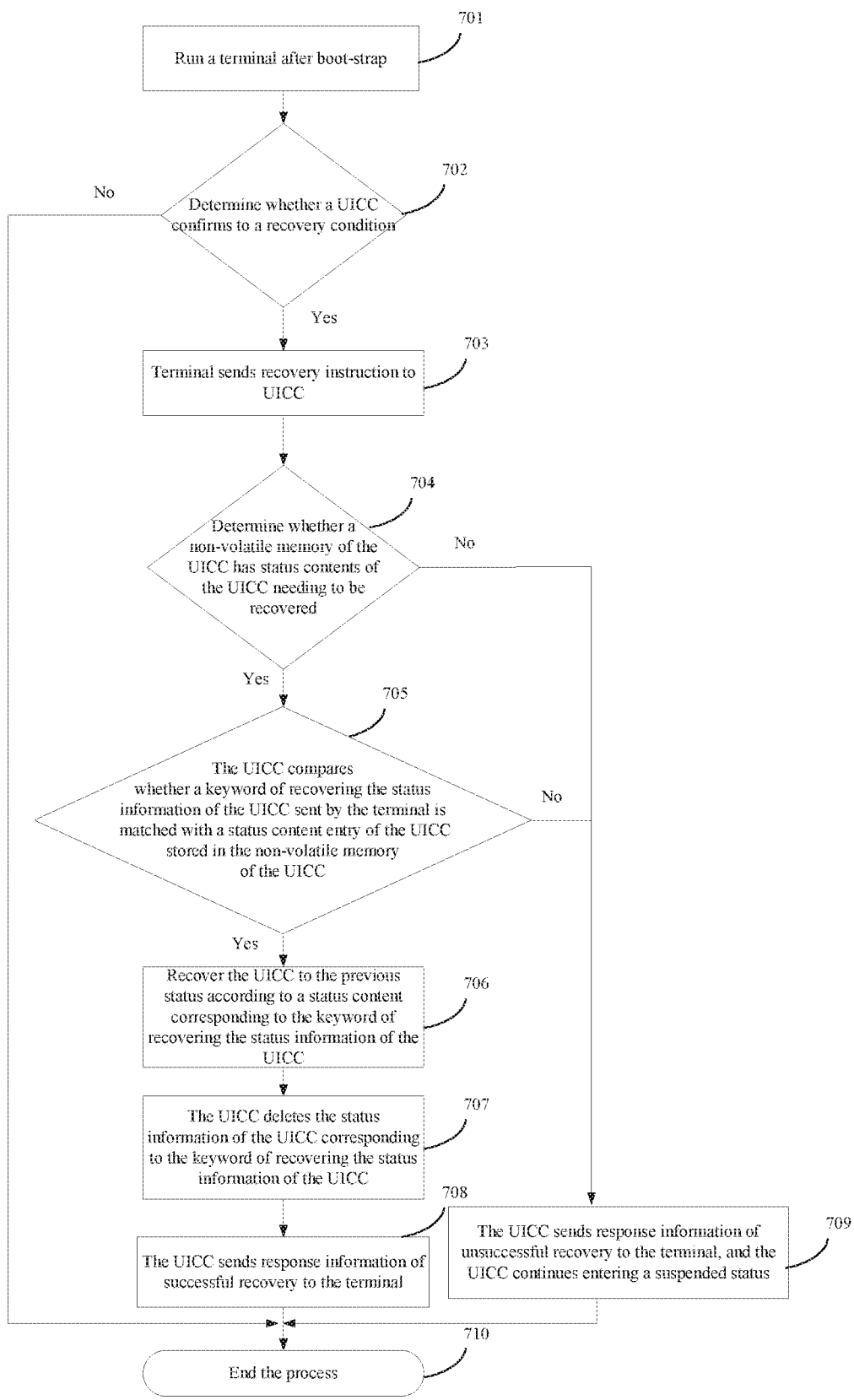
FIG. 7 is a schematic flowchart of a UICC recovery process according to the embodiments of the present disclosure.

FIG. 7 is a schematic flowchart of a UICC recovery process according to the embodiments of the present disclosure. As shown in FIG. 7, the process includes the interaction process between a terminal and the UICC, which includes the following steps.

In step 701, a terminal is run after boot-strap.

In step 702, the UICC is determined whether to confirm to a recovery condition; If yes, step 703 is performed; otherwise, step 710 is performed.

In step 703, the terminal sends a recovery command to the UICC.

In step 704, a non-volatile memory of the UICC is determined whether to have status contents of the UICC needing to be recovered; If yes, step 705 is performed; otherwise, step 709 is performed.

In step 705, the UICC compares whether a keyword of recovering the status information of the UICC sent by the terminal is matched with a status content entry of the UICC stored in the non-volatile memory of the UICC; if yes, step 706 is performed; otherwise, step 709 is performed.

In step 706, the UICC is recovered to the previous status according to a status content corresponding to the keyword of recovering the status information of the UICC.

In step 707, the UICC deletes the status information of the UICC corresponding to the keyword of recovering the status information of the UICC.

In step 708, the UICC sends response information of successful recovery to the terminal, and then step 710 is performed.

In step 709, the UICC sends response information of unsuccessful recovery to the terminal, and the UICC continues entering a suspended status.

In step 710, the process is ended.

Figure 8:
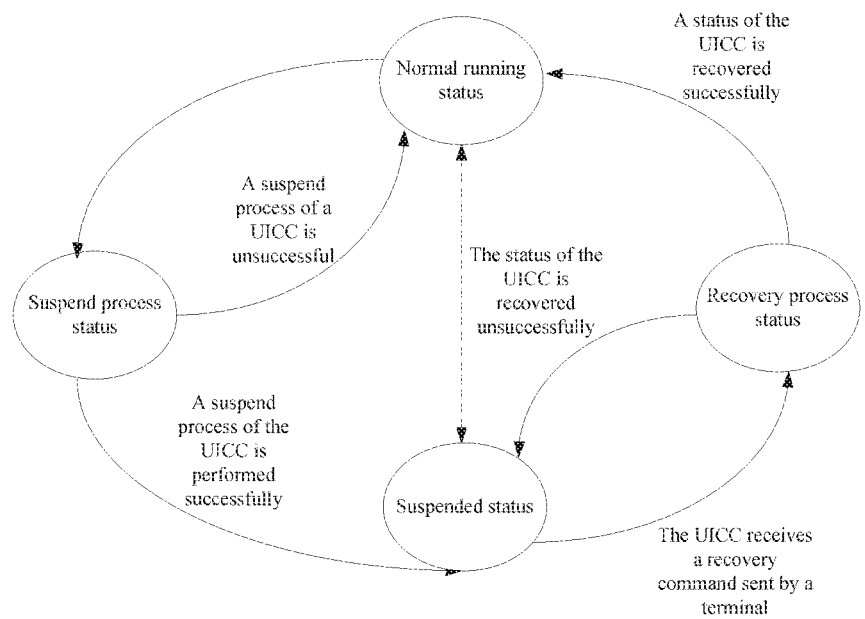
FIG. 8 is a schematic diagram of a UICC status machine according to the embodiments of the present disclosure.

FIG. 8 is a schematic diagram of a UICC status machine according to the embodiments of the present disclosure. As shown in FIG. 8, a running process of the UICC status machine method includes: a normal running status, a suspend process status, a suspended status and a recovery process status; in the suspended process status, when the UICC suspend process is un successful, the UICC returns to the normal running status, and when the UICC suspended process of the UICC is successful, the UICC enters the suspended status; when the UICC receives the recovery command of the terminal, the recovery process status is performed, and when the status recovery of the UICC is successful, the UICC enters the normal running status; otherwise, the status recovery of the UICC is unsuccessful, and the UICC returns to the suspended status.

Figure 9:
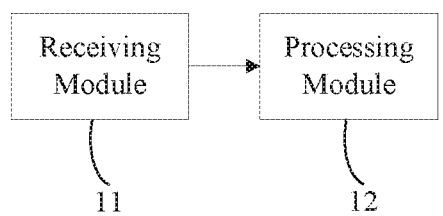
FIG. 9 is a structural schematic diagram of a first embodiment of an apparatus for reducing power consumption of a terminal according to the embodiments of the present disclosure.

FIG. 9 is a structural schematic diagram of a first embodiment of an apparatus for reducing power consumption of a terminal according to the embodiments of the present disclosure. As shown in FIG. 9, the apparatus includes:

a receiving module 11 configured to receive a suspend command of a terminal; and a processing module 12 configured to store status information of a UICC.

Optionally, the apparatus further includes:

a sending module 14 configured to send a suspend response command to the terminal, the suspend response command including a suspend time duration and a keyword of recovering the status information of the UICC.

Figure 10:
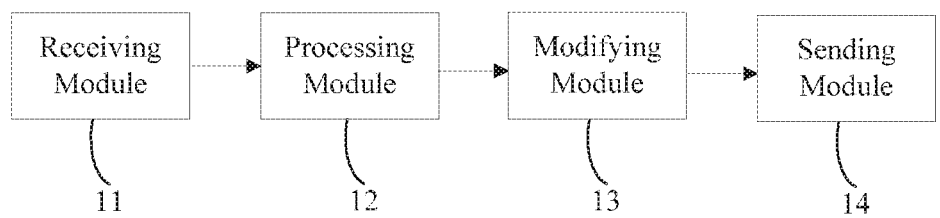
FIG. 10 is a structural schematic diagram of a first embodiment of an apparatus for reducing power consumption of a terminal according to the embodiments of the present disclosure.

FIG. 10 is a structural schematic diagram of a second embodiment of an apparatus for reducing power consumption of a terminal according to the embodiments of the present disclosure. As shown in FIG. 10, on the basis of the first embodiment, the apparatus further includes:

a modifying module 13 configured to modify a UICC service table to add instruction information of instructing the suspend command and a recovery command into the UICC service table, wherein:

the sending module 14 is configured to send the modified UICC service table to the terminal.

Optionally, the modifying module 13 is specifically configured to:

add first instruction information and second instruction information after the UICC service table; wherein, the first instruction information instructs a UICC suspend command, and the second instruction information instructs a UICC recovery command.

Optionally, the status information of the UICC includes:

a status of a Network Access Application NAA selected by each logical channel of the UICC, a security condition of each network access application of the UICC, a basic file selected by each logical channel of the UICC, and at least one of a corresponding record and a status of an application toolbox of the UICC.

Figure 11:
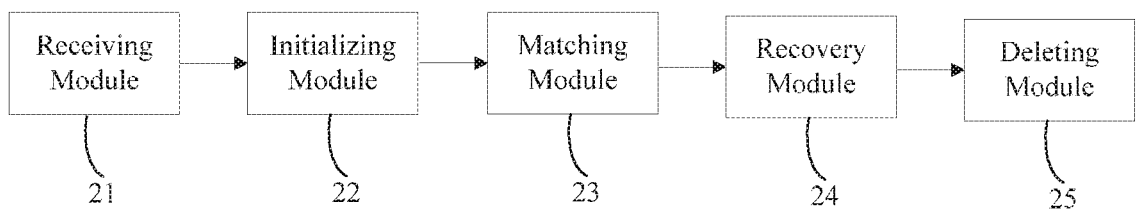
FIG. 11 is a structural schematic diagram of a third embodiment of an apparatus for reducing power consumption of a terminal according to the embodiments of the present disclosure.

FIG. 11 is a structural schematic diagram of a third embodiment of an apparatus for reducing power consumption of a terminal according to the embodiments of the present disclosure. As shown in FIG. 11, the apparatus includes:

a receiving module 21 configured to receive a recovery command of a terminal, the recovery command including: a keyword of recovering status information of a UICC;

an initializing module 22 configured to switch on and initialize the UICC;

a matching module 23 configured to, when the UICC confirms to a recovery condition and the status information of the UICC exists, match the a keyword of recovering the status information of the UICC in the recovery command with the status information of the UICC;

a recovery module 24 configured to, when the matching the a keyword of recovering the status information of the UICC in the recovery command with the status information of the UICC is successful, recover according to the status information of the UICC corresponding to the keyword, and send response information of successful recovery to the terminal; and a deleting module 25 configured to delete the status information of the UICC corresponding to the keyword.

Optionally, the confirming to the recovery condition includes:

the UICC not performing an initialization process, the UICC not receiving a terminal configuration command, and the UICC not performing a command to select a base file name.

Figure 12:
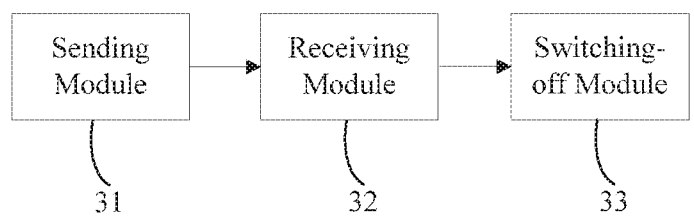
FIG. 12 is a structural schematic diagram of a fourth embodiment of an apparatus for reducing power consumption of a terminal according to the embodiments of the present disclosure.

FIG. 12 is a structural schematic diagram of a fourth embodiment of an apparatus for reducing power consumption of a terminal according to the embodiments of the present disclosure. As shown in FIG. 12, the apparatus includes:

a sending module 31 configured to, when a UICC confirms to a suspend condition, send a suspend command to the UICC;

a receiving module 32 configured to receive a suspend response command sent by the UICC; and a switching-off module 33 configured to switch off the UICC according to the suspend response command.

Optionally, the suspend response command includes a suspend time duration and a keyword of recovering status information of the UICC.

Figure 13:
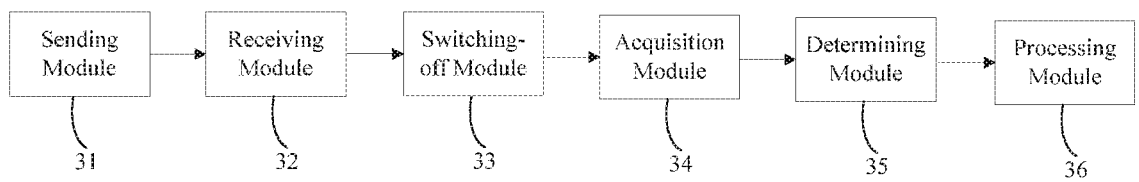
FIG. 13 is a structural schematic diagram of a fifth embodiment of an apparatus for reducing power consumption of a terminal according to the embodiments of the present disclosure.

FIG. 13 is a structural schematic diagram of a fifth embodiment of an apparatus for reducing power consumption of a terminal according to the embodiments of the present disclosure. As shown in FIG. 13, the apparatus further includes:

an acquisition module 34 configured to acquire a modified UICC service table sent by the UICC;

a determining module 35 configured to determine whether the UICC supports the suspend command and the recovery command according to the modified USIM service table; and a processing module 36 configured to, when both the UICC and the terminal support the suspend command and the recovery command, perform a subsequent suspend operation and a subsequent recovery operation.

Figure 14:
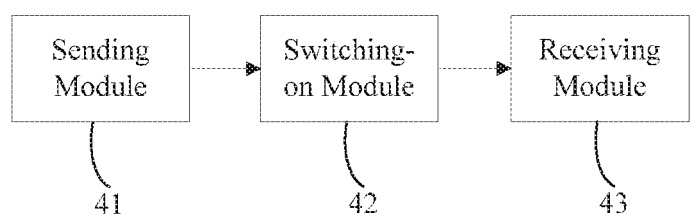
FIG. 14 is a structural schematic diagram of a sixth embodiment of an apparatus for reducing power consumption of a terminal according to the embodiments of the present disclosure.

FIG. 14 is a structural schematic diagram of a sixth embodiment of an apparatus for reducing power consumption of a terminal according to the embodiments of the present disclosure. As shown in FIG. 14, the apparatus further includes:

a sending module 41 configured to, when a UICC confirms to a recovery condition, send a recovery command to the UICC, the recovery command including: a keyword of recovering status information of a UICC;

a switching-on module 42 configured to switch on the UICC; and a receiving module 43 configured to receive response information sent by the UICC.

The embodiments of the present disclosure further provide a smart card which includes a UICC implementing the above-mentioned method.

During actual application, each of the receiving module 11, the processing module 12, the recovery module 24, the modifying module 13 and the sending module 14, the receiving module 21, the initialization module 22, the matching module 23, the recovery module 24, the deleting module 25, and the sending module 31, the receiving module 32, the switching-off module 33, the acquisition module 34, the judging module 35, the processing module 36, the sending module 41, the switching-on module 42 and the receiving module 43 may be implemented by a Central Processing Unit (CPU), a Microprocessor (MPU), a Digital Signal Processor (DSP), or a Field Programmable Gate Array (FPGA) located at the terminal.

Those skilled in the art will appreciate that embodiments of the invention can be provided as a method, a system, or a computer program product. Accordingly, the embodiments of the invention can take the form of a hardware embodiment, a software embodiment, or a combination embodiment of software and hardware. Moreover, the embodiments of the invention can take the form of a computer program product embodied on one or more computer usable storage media (including but not limited to disk storage and optical storage, etc.) in which computer usable program codes are included.

The embodiments of the invention has been described with reference to the flow charts and/or block diagrams of the method, device (system), and computer program products according to the embodiments of the invention. It should be appreciated that each flow and/or block in the flow charts and/or block diagrams, and combinations of the flows and/or blocks in the flow charts and/or block diagrams can be implemented by computer program instructions. These computer program instructions may be provided to a general purpose computer, a special purpose computer, an embedded processor, or a processor of other programmable data processing device to produce a machine for the instructions executed by the computer or the processor of other programmable data processing device to generate an apparatus for implementing the functions specified in one or more flows of the flow chart and/or in one or more blocks of the block diagram.

These computer program instructions may also be provided to a computer-readable memory that can guide the computer or other programmable data processing device to work in a given manner, so that the instructions stored in the computer-readable memory generate a product including an instruction apparatus that implements the functions specified in one or more flows of the flow chart and/or in one or more blocks of the block diagram.

These computer program instructions may also be loaded to a computer, or other programmable data processing device, so that a series of operating steps are executed on the computer, or other programmable data processing device to produce processing implemented by the computer, so that the instructions executed in the computer or other programmable data processing device provide steps for implementing the functions specified in one or more flows of the flow chart and/or in one or more blocks of the block diagram.

The above description is merely preferred embodiments of the invention, but is not intended to limit the protection scope of the invention.

INDUSTRIAL APPLICABILITY

As described above, according to the foregoing embodiments and the preferred embodiments, when detecting that the Universal Integrated Circuit Card (UICC) is in an idle status, the terminal sends the suspend command to the UICC, and after receiving the suspend command of the terminal, the UICC stores the status information of the UICC, so that the terminal controls to switch off the UICC, and the UICC enters the suspended status, thereby reducing the power consumption of the UICC, and then greatly reducing the power consumption of the terminal; and the UICC can be recovered based on related contents of the stored status information of the UICC when recovering. The method does not need to change the network side communication protocols or change the hardware structure of the terminal, thereby expanding the application scenarios of the method for reducing power consumption of a terminal, and improving the ability to reduce the power consumption.

What is claimed is:

1. A method for reducing power consumption of a terminal, comprising:

receiving a suspend command of the terminal; and storing status information of a Universal Integrated Circuit Card UICC;

wherein before the receiving the suspend command of the terminal, the method further comprises:

modifying a UICC service table to add instruction information of instructing the suspend command and a recovery command into the UICC service table; and sending the modified UICC service table to the terminal.

2. The method according to claim 1, further comprising:

sending a suspend response command to the terminal, the suspend response command comprising a suspend time duration and a keyword of recovering the status information of the UICC.

3. The method according to claim 1, wherein the modifying the UICC service table is: to add first instruction information and second instruction information after the UICC service table; wherein, the first instruction information instructs a UICC suspend command, and the second instruction information instructs a UICC recovery command.

4. The method according to claim 1, wherein the status information of the UICC further comprises:

a status of a Network Access Application NAA selected by each logical channel of the UICC, a security condition of each network access application of the UICC, a basic file selected by each logical channel of the UICC, and at least one of a corresponding record and a status of an application toolbox of the UICC.

5. A method for reducing power consumption of a terminal, comprising:

receiving a recovery command of the terminal, the recovery command comprising: a keyword of recovering status information of a UICC;

switching on and initializing the UICC;

when the UICC confirms to a recovery condition and the status information of the UICC exists, matching the keyword of recovering the status information of the UICC in the recovery command with the status information of the UICC;

when the matching is successful, recovering according to the status information of the UICC corresponding to the keyword, and sending response information of successful recovery to the terminal; and deleting the status information of the UICC corresponding to the keyword.

6. The method according to claim 5, wherein the confirming to the recovery condition comprises:

the UICC not performing an initialization process, the UICC not receiving a terminal configuration command, and the UICC not performing a command to select a base file name.

7. A method for reducing power consumption of a terminal, comprising:

when a UICC confirms to a suspend condition, sending a suspend command to the UICC;

receiving a suspend response command sent by the UICC; and switching off the UICC according to the suspend response command;

wherein before the sending the suspend command to the UICC, the method further comprises:

acquiring a modified UICC service table sent by the UICC;

determining whether the UICC supports the suspend command and a recovery command according to the modified UICC service table; and when both the UICC and the terminal support the suspend command and the recovery command, performing a subsequent suspend operation and a subsequent recovery operation.

8. The method according to claim 7, wherein the suspend response command comprises a suspend time duration and a keyword of recovering status information of the UICC.

9. The method according to claim 7, further comprising:

when the UICC confirms to a recovery condition, sending a recovery command to the UICC;

switching on the UICC; and receive response information sent by the UICC.

10. The method according to claim 9, wherein the recovery command comprises: a keyword of recovering status information of the UICC.

11. An apparatus for reducing power consumption of a terminal, comprising:

a receiving module configured to receive a suspend command of the terminal;

a processing module configured to store status information of a Universal Integrated Circuit Card UICC;

a modifying module configured to modify a UICC service table to add instruction information of instructing the suspend command and a recovery command into the UICC service table; and a sending module configured to send the modified UICC service table to the terminal.

12. The apparatus according to claim 11, wherein:

the sending module is further configured to send a suspend response command to the terminal, the suspend response command comprising a suspend time duration and a keyword of recovering the status information of the UICC.

13. An apparatus for reducing power consumption of a terminal, comprising:

a receiving module configured to receive a recovery command of the terminal, the recovery command comprising: a keyword of recovering status information of a UICC;

an initializing module configured to switch on and initialize the UICC;

a matching module configured to, when the UICC confirms to a recovery condition and the status information of the UICC exists, match the keyword of recovering the status information of the UICC in the recovery command with the status information of the UICC;

a recovery module configured to, when the matching the keyword of recovering the status information of the UICC in the recovery command with the status information of the UICC is successful, recover according to the status information of the UICC corresponding to the keyword, and send response information of successful recovery to the terminal; and a deleting module configured to delete the status information of the UICC corresponding to the keyword.

14. An apparatus for reducing power consumption of a terminal, comprising:

a sending module configured to, when a UICC confirms to a suspend condition, send a suspend command to the UICC;

a receiving module configured to receive a suspend response command sent by the UICC;

a switching-off module configured to switch off the UICC according to the suspend response command;

an acquisition module configured to acquire a modified UICC service table sent by the UICC;

a determining module configured to determine whether the UICC supports the suspend command and the recovery command according to the modified UICC service table; and a processing module configured to, when both the UICC and the terminal support the suspend command and the recovery command, perform a subsequent suspend operation and a subsequent recovery operation.

15. The apparatus according to claim 14, further comprising:

a sending module configured to, when the UICC confirms to a recovery condition, send a recovery command to the UICC;

a switching-on module configured to switch on the UICC; and a receiving module configured to receive response information sent by the UICC.

16. A smart card, wherein the smart card comprises a UICC implementing the methods according to any one of claims claims 1, 2, and 3-6.

* * * * *